US006784354B1

(12) United States Patent
Lu et al.

(10) Patent No.: US 6,784,354 B1
(45) Date of Patent: Aug. 31, 2004

(54) GENERATING A MUSIC SNIPPET

(75) Inventors: Lie Lu, Beijing (CN); Hong-Jiang Zhang, Beijing (CN); Po Yuan, Renton, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 10/387,628

(22) Filed: Mar. 13, 2003

(51) Int. Cl.[7] .......... G01H 7/00

(52) U.S. Cl. .......... 84/616; 84/609

(58) Field of Search .......... 84/616, 609, 645

(56) References Cited

U.S. PATENT DOCUMENTS 6,633,845 B1 * 10/2003 Logan et al. .......... 704/255
2004/0064209 A1 * 4/2004 Zhang .......... 700/94

* cited by examiner

*Primary Examiner*—Jeffrey W Donels
(74) *Attorney, Agent, or Firm*—Lee & Hayes, PLLC

(57) ABSTRACT

Systems and methods for extracting a music snippet from a music stream are described. In one aspect, the music stream is divided into multiple frames of fixed length. The most-salient frame of the multiple frames is then identified. One or more music sentences are then extracted from the music stream as a function of peaks and valleys of acoustic energy across sequential music stream portions. The music snippet is the sentence that includes the most-salient frame.

25 Claims, 4 Drawing Sheets

GENERATING A MUSIC SNIPPET

TECHNICAL FIELD

The invention pertains to analysis of digital music.

BACKGROUND

As proliferation and end-user access of music files on the Internet increases, efficient techniques to provide end-users with music summaries that are representative of larger music files are increasingly desired. Unfortunately, conventional techniques to generate music summaries often result in a musical abstract with music transitions uncharacteristic of the song being summarized. For example, suppose a song is one-hundred and twenty (120) second long. A conventional music summary may include the first ten (10) seconds of the song and the last 10 seconds of the song appended to the first 10 seconds, skipping the middle 100 seconds of the song. Although this is an example, and other song portions could have been appended to one-another to generate the summary, this example emphasizes that song portions used to generate a conventional music summary are typically not contiguous in time with respect to one another, but rather an aggregation of multiple disparate portions of a song. Such non- contiguous music pieces, when appended to one another, often present undesired acoustic discontinuities and unpleasant listening experiences to an end-user seeking to hear a representative portion of the song without listening to the entire song.

In view of this, systems and methods to generate music summaries with representative musical transitions are greatly desired.

SUMMARY

Systems and methods for extracting a music snippet from a music stream are described. In one aspect, the music stream is divided into multiple frames of fixed length. The most-salient frame of the multiple frames is then identified. One or more music sentences are then extracted from the music stream as a function of peaks and valleys of acoustic energy across sequential music stream portions. The music snippet is the sentence that includes the most-salient frame.

BRIEF DESCRIPTION OF THE DRAWINGS

The following detailed description is described with reference to the accompanying figures. In the figures, the left-most digit of a component reference number identifies the particular figure in which the component first appears.

DETAILED DESCRIPTION

Overview

Figure 1:
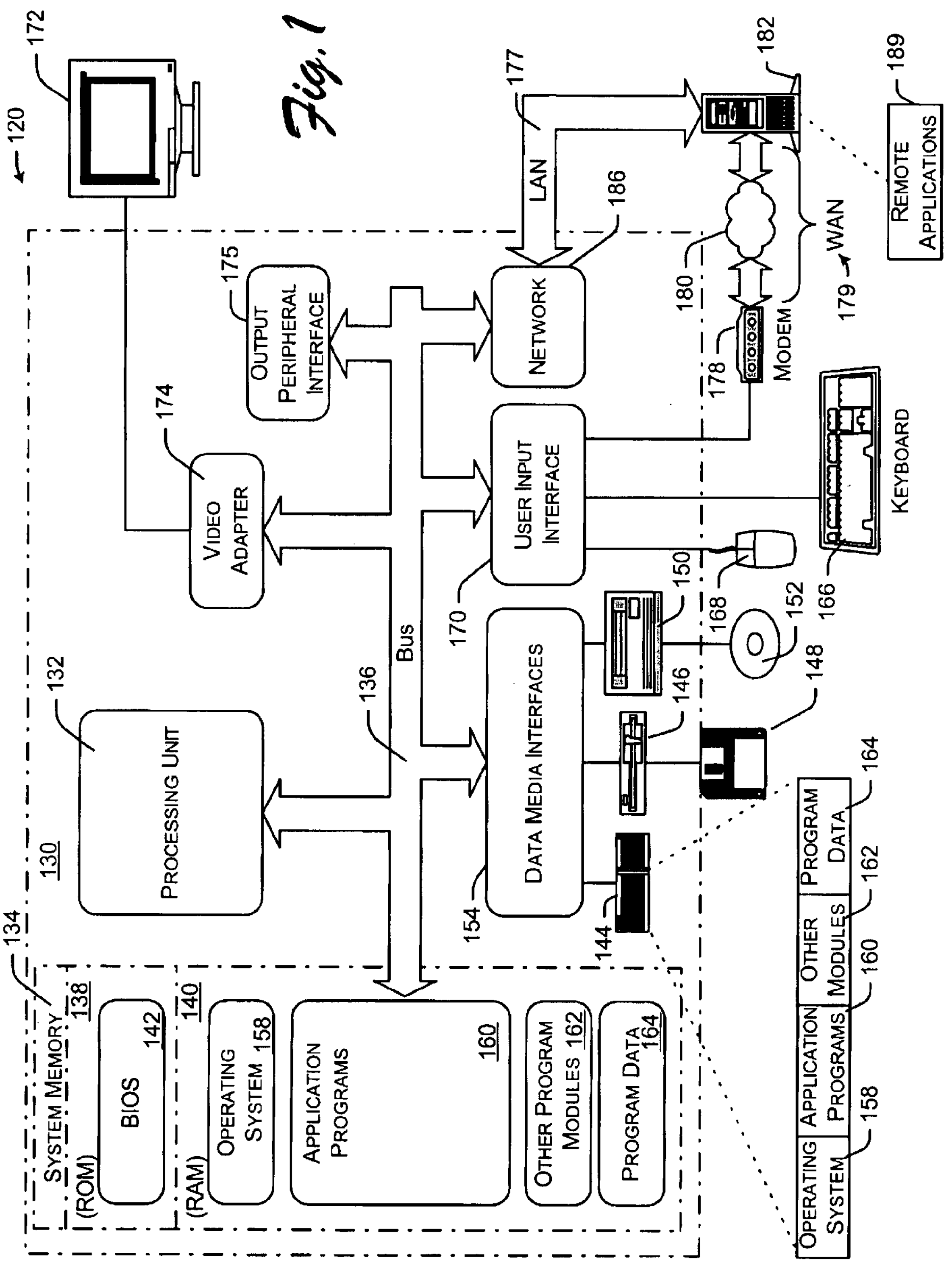
FIG. 1 is a block diagram of an exemplary computing environment within which systems and methods to generate a music snippet of the substantially most representative portion of a song may be implemented.

Systems and methods to generate a music snippet are described. A music snippet is a music summary that represents the most-salient and substantially representative portion of a longer music stream. Such a longer music stream may include, for example, any combination of distinctive sounds such as melody, rhythm, harmony, and/or lyrics. For purposes of this discussion, the terms song and composition are used interchangeably to represent such music stream. A music snippet is a sequential slice of a song, not a discontinuous aggregation of multiple disparate portions of a song as is generally found in a conventional music summary.

To generate a music snippet from a song, the song is divided into multiple similarly sized segments or frames. Each frame represents a fixed but configurable time interval, or "window" of music. In one implementation, the music frames are generated such that a frame overlaps a previous frame by a set yet configurable amount. The music frames are analyzed to generate a saliency value for each frame. The saliency values are a function of a frame's acoustic energy, frequency of occurrence across the song, and positional weight. A "most-salient frame" is identified as the having the largest saliency value as compared to the saliency values of the other music frames.

Music sentences (most frequently eight (8) or sixteen (16) bars in length, according to music composition theory) are identified based on peaks and valleys of acoustic energy across sequential song portions. Although conventional sentences may be selected from 8 or 16 bars, this implementation is not limited to these sentence sizes and may comprise any number of bars, for example, selected from a range of 8 to 16 bars. The music sentence that includes the most-salient frame is the music snippet, which will generally include any repeat melody presented in the song. Post-processing of the music snippet is optionally performed to adjust the beginning/end boundary of the music snippet based on the boundary confidence of the previous and subsequent music sentence.

An Exemplary Operating Environment

Turning to the drawings, wherein like reference numerals refer to like elements, the invention is illustrated as being implemented in a suitable computing environment. Although not required, the invention is described in the general context of computer-executable instructions, such as program modules, being executed by a personal computer. Program modules generally include routines, programs, objects, components, data structures, etc., that perform particular tasks or implement particular abstract data types.

FIG. 1 illustrates an example of a suitable computing environment 120 on which the subsequently described systems, apparatuses and methods to generate a music snippet may be implemented. A music snippet is the substantially most representative portion of a piece of music as determined by multiple objective criteria, each of which is described below. Exemplary computing environment 120 is only one example of a suitable computing environment and is not intended to suggest any limitation as to the scope of use or functionality of systems and methods the described herein. Neither should computing environment 120 be interpreted as having any dependency or requirement relating to any one or combination of components illustrated in computing environment 120.

The methods and systems described herein are operational with numerous other general purpose or special purpose computing system environments or configurations. Examples of well known computing systems, environments, and/or configurations that may be suitable include, but are not limited to, including hand-held devices, multi-processor systems, microprocessor based or programmable consumer electronics, network PCs, minicomputers, mainframe computers, portable communication devices, and the like. The invention may also be practiced in distributed computing environments where tasks are performed by remote processing devices that are linked through a communications network. In a distributed computing environment, program modules may be located in both local and remote memory storage devices.

As shown in FIG. 1, computing environment 120 includes a general-purpose computing device in the form of a computer 130. The components of computer 130 may include one or more processors or processing units 132, a system memory 134, and a bus 136 that couples various system components including system memory 134 to processor 132.

Bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus also known as Mezzanine bus.

Computer 130 typically includes a variety of computer readable media. Such media may be any available media that is accessible by computer 130, and it includes both volatile and non-volatile media, removable and non-removable media. In FIG. 1, system memory 134 includes computer readable media in the form of volatile memory, such as random access memory (RAM) 140, and/or non-volatile memory, such as read only memory (ROM) 138. A basic input/output system (BIOS) 142, containing the basic routines that help to transfer information between elements within computer 130, such as during startup, is stored in ROM 138. RAM 140 typically contains data and/or program modules that are immediately accessible to and/or presently being operated on by processor 132.

Computer 130 may further include other removable/non-removable, volatile/non-volatile computer storage media. For example, FIG. 1 illustrates a hard disk drive 144 for reading from and writing to a non-removable, non-volatile magnetic media (not shown and typically called a "hard drive"), a magnetic disk drive 146 for reading from and writing to a removable, non-volatile magnetic disk 148 (e.g., a "floppy disk"), and an optical disk drive 150 for reading from or writing to a removable, non-volatile optical disk 152 such as a CD-ROM/R/RW, DVD-ROM/R/RW/+R/RAM or other optical media. Hard disk drive 144, magnetic disk drive 146 and optical disk drive 150 are each connected to bus 136 by one or more interfaces 154.

The drives and associated computer-readable media provide nonvolatile storage of computer readable instructions, data structures, program modules, and other data for computer 130. Although the exemplary environment described herein employs a hard disk, a removable magnetic disk 148 and a removable optical disk 152, it should be appreciated by those skilled in the art that other types of computer readable media which can store data that is accessible by a computer, such as magnetic cassettes, flash memory cards, digital video disks, random access memories (RAMs), read only memories (ROM), and the like, may also be used in the exemplary operating environment.

A number of program modules may be stored on the hard disk, magnetic disk 148, optical disk 152, ROM 138, or RAM 140, including, e.g., an operating system 158, one or more application programs 160, other program modules 162, and program data 164.

A user may provide commands and information into computer 130 through input devices such as keyboard 166 and pointing device 168 (such as a "mouse"). Other input devices (not shown) may include a microphone, joystick, game pad, satellite dish, serial port, scanner, camera, etc. These and other input devices are connected to the processing unit 132 through a user input interface 170 that is coupled to bus 136, but may be connected by other interface and bus structures, such as a parallel port, game port, or a universal serial bus (USB).

A monitor 172 or other type of display device is also connected to bus 136 via an interface, such as a video adapter 174. In addition to monitor 172, personal computers typically include other peripheral output devices (not shown), such as speakers and printers, which may be connected through output peripheral interface 175.

Computer 130 may operate in a networked environment using logical connections to one or more remote computers, such as a remote computer 182. Remote computer 182 may include many or all of the elements and features described herein relative to computer 130. Logical connections shown in FIG. 1 are a local area network (LAN) 177 and a general wide area network (WAN) 179. Such networking environments are commonplace in offices, enterprise-wide computer networks, intranets, and the Internet.

When used in a LAN networking environment, computer 130 is connected to LAN 177 via network interface or adapter 186. When used in a WAN networking environment, the computer typically includes a modem 178 or other means for establishing communications over WAN 179. Modem 178, which may be internal or external, may be connected to system bus 136 via the user input interface 170 or other appropriate mechanism.

Depicted in FIG. 1, is a specific implementation of a WAN via the Internet. Here, computer 130 employs modem 178 to establish communications with at least one remote computer 182 via the Internet 180.

In a networked environment, program modules depicted relative to computer 130, or portions thereof, may be stored in a remote memory storage device. Thus, e.g., as depicted in FIG. 1, remote application programs 189 may reside on a memory device of remote computer 182. It will be appreciated that the network connections shown and described are exemplary and other means of establishing a communications link between the computers may be used.

Figure 2:
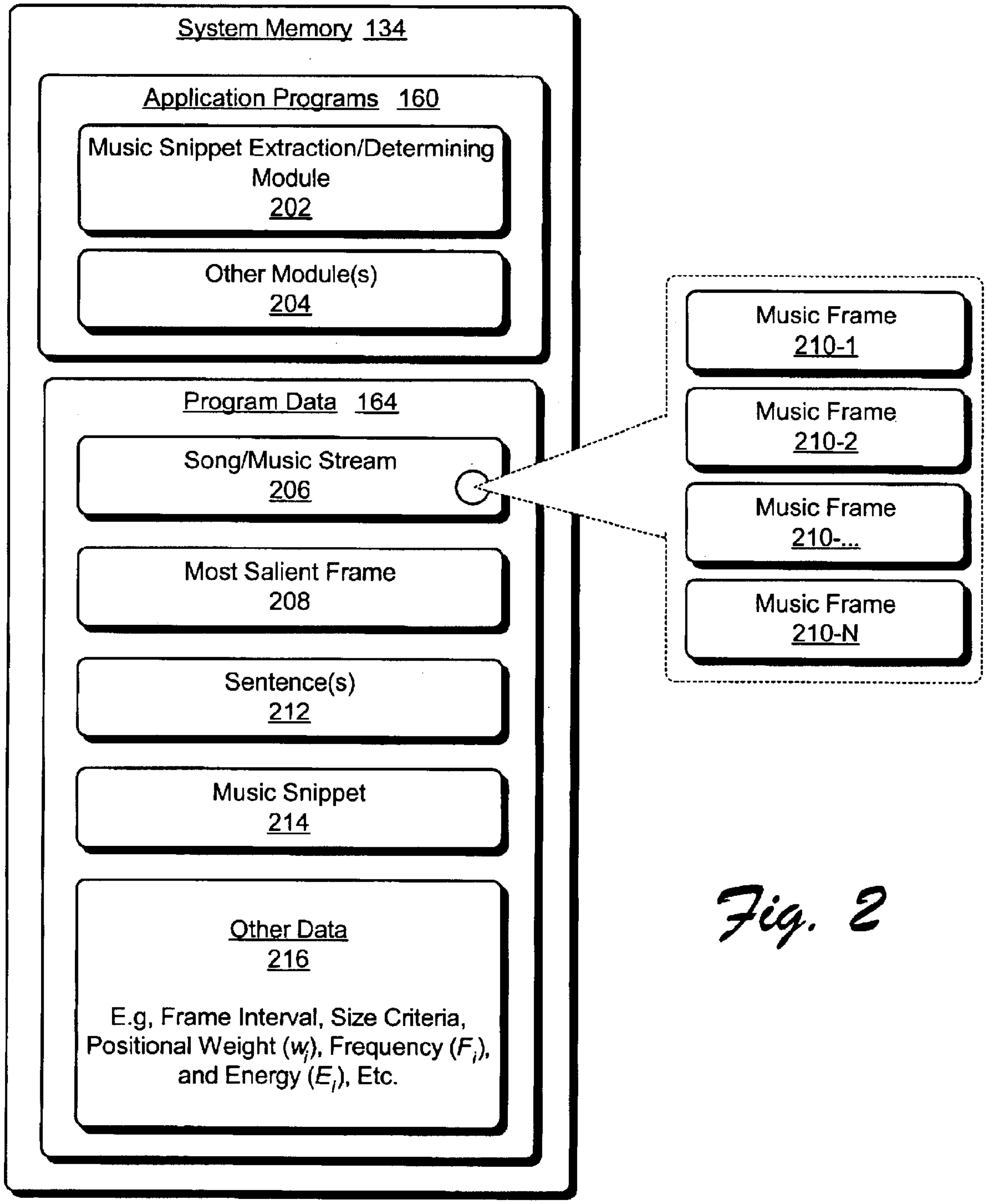
FIG. 2 is a block diagram that shows further exemplary aspects of system memory of FIG. 1, including application programs and program data used to generate a music snippet.

FIG. 2 is a block diagram that shows further exemplary aspects of system memory 134 of FIG. 1, including application programs 160 and program data 164. System memory 134 is shown to include a number of application programs including, for example, music snippet extraction (MSE) module 202 and other modules 204 such as an operating system to provide a run-time environment, a multimedia application to play music/audio, and so on. To generate or extract a music snippet, the MSE module analyzes a song/music stream 206 (e.g., a music file) to identify a single most-salient frame 208. To this end, the MSE module divides the song into fixed length frames 210-1 through 210-N; the fixed length being a function of a configurable frame interval (e.g., the frame interval of "other data" 216). Each music frame has a relative location, or position within the song and also with respect to each other frame in the song. For instance, a song has a first frame 110-1, an immediately subsequent frame 110-2, and so on. For purposes of discussion, a first frame which is juxtaposed, adjacent, or overlaps a second frame is considered to be contiguous and sequential in time to the second frame. Whereas, a first frame which is separated (i.e., not juxtaposed, adjacent, or overlapping) from a second frame by at least one other frame is not contiguous and non-sequential in time with respect to the second frame.

The MSE module 202 then segments the song 206 into one or more music sentences 212 as a function of frame energy (e.g., the sound-wave amplitude of each frame 210-1 through 210-N), calculated possibilities that specific frames represent sentence boundaries, and one or more sentence size criterion. Each sentence includes a set of frames that are contiguous/sequential in time with respect to a juxtaposed, adjacent, and/or overlapping frame of the set. For purposes of discussion, such sentence criterion/criteria are represented in the "other data" 216 portion of the program data. The sentence 210 that includes the most-salient frame 208 is selected as the music snippet 214.

Salient frame selection, music structure segmentation, and music snippet formation are now described in greater detail.

Salient Frame Selection

The MSE module 202 identifies the most-salient frame 208 by first calculating a respective saliency value ($S_i$) for each frame 210-1 through 210-N. A frame's saliency value ($S_i$) is a function of the frame's positional weight ($w_i$), frequency of occurrence ($F_i$), and respective energy level ($E_i$) as shown below in equation 1.

$$S_i = w_i \cdot F_i \cdot E_i \quad (1),$$

wherein $w_i$ represents the weight which is set by a frame i's relative position to the beginning, middle, or end of the song 206, and $F_i$ and $E_i$ represent the respective frequency of appearance and energy of the i-th frame. Frame weight ($w_i$) is a function of the total number N of frames in the song and is calculated as follows:

$$w_i = \begin{cases} 1 & i <= \frac{1}{3}N \\ \frac{3(N-i)}{2N} & i > \frac{1}{3}N \end{cases}. \quad (2)$$

Each frame's frequency ($F_i$) of appearance across the song 206 is calculated as a function of frame 210-1 through 210-N clustering. Although any number of known clustering algorithms could be used to identify frame clustering, in this implementation, the MSE module 202 clusters the frames into several groups using the Linde-Buzo-Gray (LBG) clustering algorithm. To this end, the distance between frames and cluster numbers are specified. In particular, let $V_i$ and $V_j$ represent the feature vectors of frames i and j. The distance measurement is based on vector difference and defined as follows:

$$D_{ij} = \|V_i - V_j\| \quad (3).$$

The measure of equation 3 measure considers only two isolated frames. For a more comprehensive representation of frame-to-frame distance, other neighboring temporal frames are taken into considerations. For instance, suppose that m previous and m next frames are considered with weights $[w_{-m}, \ldots, W_m]$, the better similarity is developed as follows.

$$D_{ij} = \sum_{k=-m}^{m} w_k D_{i+k,j+k}, \quad (4)$$

With respect to cluster numbers, in one implementation, sixty-four (64) clusters are used. In another implementation, cluster numbers are estimated in the clustering algorithm.

After the clustering, the appearing frequency of each frame 210-1 through 210-N is calculated using any one of a number of known techniques. In this implementation, the frame appearance frequency is determined as follows. Each cluster is denoted as $C_k$ and the number of frames in each cluster is represented as $N_k$ (1<k<64). The appearing frequency of i-th frame ($F_i$) is calculated as:

$$F_i = \frac{N_k}{\sum N_k}, \quad (5)$$

wherein frame i belongs to cluster $C_k$.

Each frame's energy ($E_i$) is calculated using any of a number of known techniques for measuring the amplitude of the music signal.

Subsequent to calculating a respective saliency value $S_i$ for each frame 210-1 through 210-N, the MSE module 202 sets the most-salient frame 208 to the frame having the highest calculated saliency value.

Music Structure Segmentation

The MSE module 202 segments the song/music stream 206 into one or more music sentences 212. To this end, it is noted that acoustic/vocal energy generally decreases with greater magnitude, and the music note or vocal generally lasts for a longer amount of time near the end of a sentence, as compared to the notes/vocals in the middle of sentence. At the same time, since a music note is bounded by its onset and offset, we can take each valley of the energy curve as the boundary of a note. Consider the sentence boundary should be aligned with note boundary, the valleys in acoustic energy signals are supposed as potential candidates of sentence boundary. Thus, an energy decrease and music note/vocal duration are both used to detect sentence boundary In light of this, the MSE module 202 calculates a probability indicative of whether a frame represents the boundary of a sentence. That is, Once a frame 210 (i.e., one of the frames 210-1 through 210-N) is detected as an acoustic energy valley, the current acoustic energy valley, the acoustic energy value of a previous and next energy peak, and the frames' positions in the song 206, are used to calculate the probability value of a frame being a sentence boundary.

Figure 3:
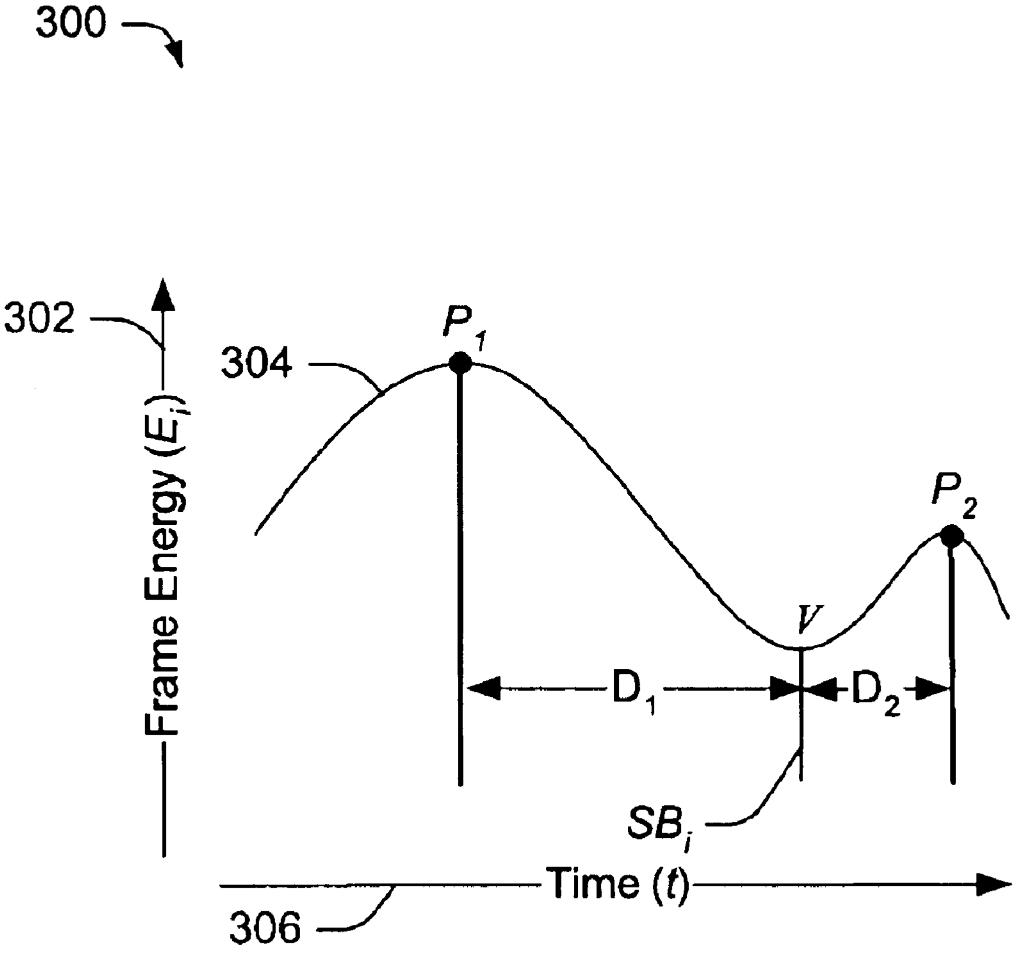
FIG. 3 is a graph of music energy as a function of time. In particular, the graph illustrates how an exemplary music sentence boundary may be adjusted as a function of preceding and subsequent music energy levels.

FIG. 3 is a graph 300 of a portion of music energy sequence as a function of time. It illustrates how to calculate the probability value of a frame being a sentence boundary. The vertical axis 302 represents the amplitude of music energy 304. The horizontal axis 306 represents time (t). To provide an objective confidence measure of whether a energy valley (V) from frame 210-1 through 210-N at a particular point in time (t) represents a sentence boundary SB, the position and energy of music corresponding to a previous energy peak ($P_1$) and a next energy peak ($P_2$), are considered.

A probability/possibility that the i-th frame (i.e., one of frames 210-1 through 210-N) is a sentence boundary is calculated as follows:

$$SB_i \propto \begin{cases} 0 & i \notin ValleySet \\ \frac{P_1 - V}{V} \frac{P_2 - V}{V}(D_1 + D_2) & i \in ValleySet \end{cases}, \quad (6)$$

wherein $SB_i$ is the possibility that i-th frame is a music sentence boundary, and ValleySet is the set of valleys in the energy curve of music. If the i-th frame is not a valley, it is not possible to be a sentence boundary, thus the $SB_i$ is zero.

If the i-th frame is a valley, the possibility is calculated by the second part of the Equation (6). $P_1$, $P_2$ and V are the respective energy values ($E_i$) of the previous peak, a next energy peak and the current energy valley (i.e. i-th frame). $D_1$ and $D_2$ represent respective time durations from the current energy valley V to the previous peak $P_1$, and next peak $P_2$, respectively, which are used to estimate the duration of a music note or vocal sound Based on possibility measure $SB_i$ of each frame 210-1 through 210-N, the song 206 is segmented into sentences 210 as follows. The first sentence boundary is taken as the beginning of the song. Given a previous sentence boundary, a next sentence boundary is selected to be a frame with the largest possibility measure $SB_i$ that also provides a sentence of a reasonable length (e.g., about 8 to 16 bars of music) from the previous boundary.

Snippet Formation

Referring to FIG. 2, the MSE module 202 evaluates sentences 212 to identify a particular sentence 212 that encapsulates the most-salient frame 208; this particular sentence is selected by the MSC module to be the music snippet 214. The MSE module then determines whether the length of the extracted music snippet is smaller than a desired and configurable snippet size. If so, the MSE module integrates at least a portion of an either immediately previous or immediately subsequent sentence to the music snippet as to obtain the desired snippet size. (Such a size criteria is represented as a portion of "other data" 216). In particular, the previous or subsequent sentence whose boundary having a larger $SB_i$ value as compared to the other is integrated into the music snippet to obtain the target snippet size. In this implementation, either the whole immediately previous or immediately subsequent sentence is added to the snippet to obtain a target snippet size.

An Exemplary Procedure

Figure 4:
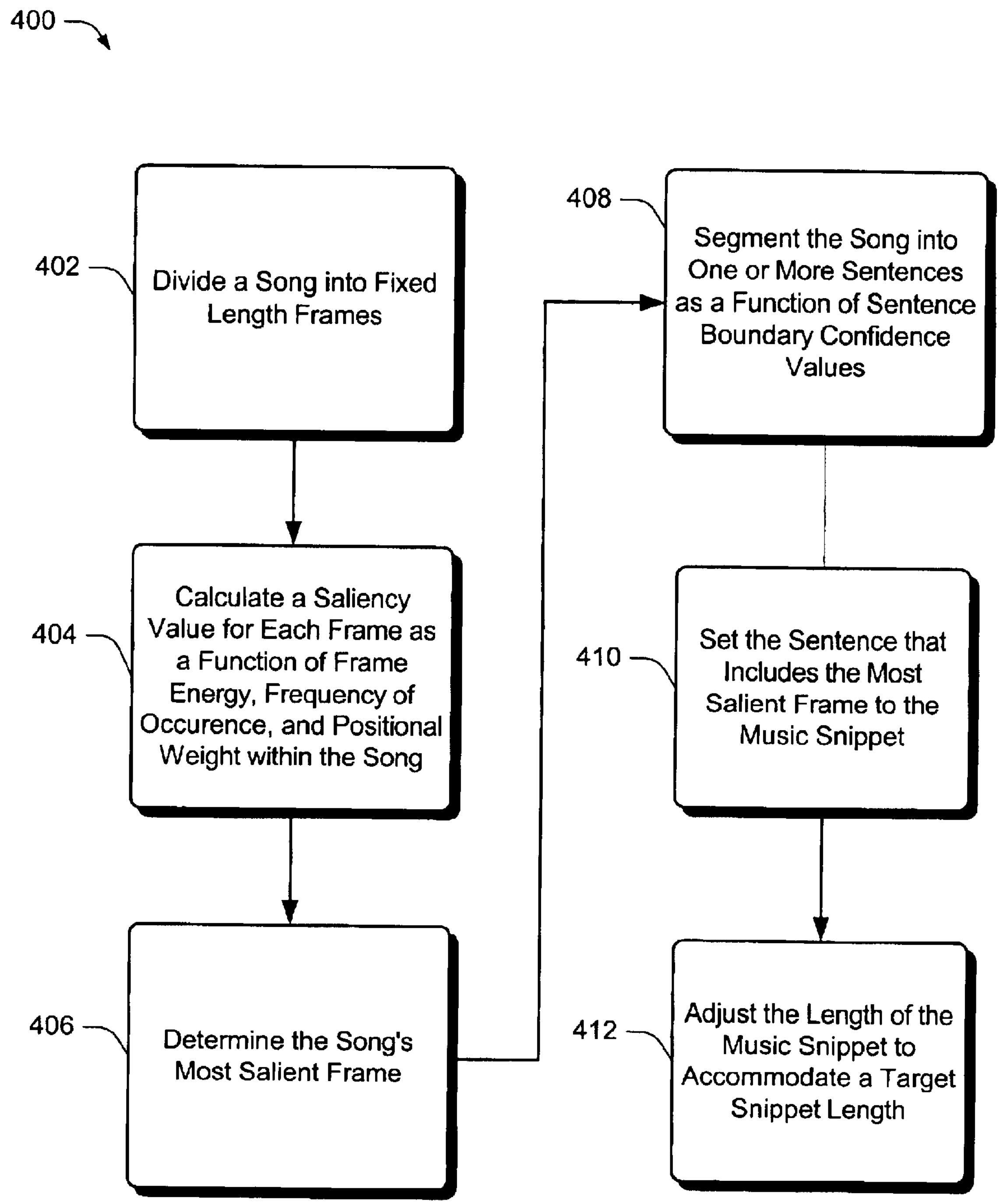
FIG. 4 shows an exemplary procedure to generate a music snippet, the substantially most representative portion of a song.

FIG. 4 shows an exemplary procedure 400 to generate a music snippet. For purposes of discussion, the procedural operations are described in reference to program module and data components of FIG. 2. At block 402, the music snippet extraction (MSE) module 202 (FIG. 2) divides a music stream 206 (FIG. 2) such as a song or composition into multiple similarly sized segments or frames 210-1 through 210-N (FIG. 2). As described above, each frame represents a fixed and configurable time interval, or "window" of the song. At block 404, the MSE module calculates a saliency value ($S_i$) for each frame. A frame's saliency value is a function of the frame's positional weight ($w_i$), frequency of occurrence ($F_i$), and respective energy level ($E_i$), as described above with respect to equation 1. At block 406, the MSE module identifies the most-salient frame 208 (FIG. 2), which is the frame with the highest calculated saliency value ($S_i$).

At block 408, the MSE module 202 (FIG. 2) divides the song 208 (FIG. 2) into one or more music sentences 212 (FIG. 2) as a function of frame energy (the sound-wave loudness of each frame) and a target sentence length (e.g., 8 or 16 bars of music). At block 410, the MSE module selects the sentence that includes the most-salient frame 208 (FIG. 2) as the music snippet 214 (FIG. 2). At block 412, the MSE module adjusts the music snippet length to accommodate any snippet length preferences. In particular, a previous or subsequent sentence is integrated into the music snippet as a function of the boundary confidence ($SB_i$) of these two sentences. The sentence with the largest boundary confidence is integrated into the music snippet.

Conclusion

The described systems and methods generate a music snippet from a music stream such as a song/composition. Although the systems and methods have been described in language specific to structural features and methodological operations, the subject matter as defined in the appended claims are not necessarily limited to the specific features or operations described. Rather, the specific features and operations are disclosed as exemplary forms of implementing the claimed subject matter.

What is claimed is:

1. A method for extracting a music snippet from a music stream, the method comprising:
- dividing the music stream into multiple frames of fixed length;
- identifying a most-salient frame of the multiple frames;
- extracting one or more music sentences from the music stream as a function of peaks and valleys of acoustic energy across sequential music stream portions; and
- selecting the music snippet as a sentence of the one or more sentences that comprises the most-salient frame.

2. A method as recited in claim 1, wherein the fixed length is a configurable amount of time.

3. A method as recited in claim 1, wherein the music snippet comprises more than a single sentence.

4. A method as recited in claim 1, wherein each frame overlaps another frame with respect to time by a set amount.

5. A method as recited in claim 1, wherein extracting the one or more sentences is further a function of a target sentence length.

6. A method as recited in claim 1, wherein extracting the one or more sentences is further comprises:
- calculating a respective sentence boundary possibility for each frame of the multiple frames; and
- for each of the one or more sentences, determining a last frame for the sentence as a function of a corresponding sentence boundary possibility.

7. A method as recited in claim 1, wherein extracting the one or more sentences is further a function of a target sentence length selected from eight (8) to sixteen (16) bars in length.

8. A method as recited in claim 1, and wherein the method further comprises adjusting music snippet length as a function of boundary confidence of previous and subsequent music sentences.

9. A method as recited in claim 1, wherein identifying the most-salient frame further comprises calculating a respective saliency value for each frame, and wherein the most-salient frame is a frame of the multiple frames having a largest value of the respective saliency values.

10. A method as recited in claim 9, wherein calculating the respective saliency value for a frame of the multiple frames is based on acoustic energy of the frame, a frequency of occurrence of the frame across the music stream, and a positional weight of the fame.

11. A computer-readable medium for extracting a music snippet from a music stream, the computer-readable medium comprising computer-program executable instructions executable by a processor for:
- dividing the music stream into multiple frames of fixed length;
- identifying a most-salient frame of the multiple frames;
- extracting one or more music sentences from the music stream as a function of peaks and valleys of acoustic energy across sequential music stream portions; and
- selecting the music snippet as a sentence of the one or more sentences that comprises the most-salient frame.

12. A computer-readable medium for extracting a music snippet from a music stream, the computer-readable medium comprising computer-program instructions executable by a processor for:

dividing the music stream into multiple frames of configurable length;

identifying a most-salient frame of the multiple frames;

extracting one or more music sentences from the music stream as a function of peaks and valleys of acoustic energy across sequential music stream portions and a configurable target sentence length; and selecting the music snippet as a sentence of the one or more sentences that comprises the most-salient frame.

13. A computer-readable medium as recited in claim 12, wherein each frame overlaps another frame with respect to time by a set amount.

14. A computer-readable medium as recited in claim 12, wherein the computer-program instructions for identifying a most-salient frame is a function of a respective saliency value for each frame of the multiple frames, the respective saliency value being a function of acoustic energy of the frame, a frequency of occurrence of the frame across the music stream, and a positional weight of the frame.

15. A computer-readable medium as recited in claim 12, wherein the computer-program instructions for extracting the one or more sentences further comprise instructions for:

calculating a respective sentence boundary possibility for each frame of the multiple frames; and for each of the one or more sentences, determining a last frame for the sentence as a function of a corresponding sentence boundary possibility.

16. A computer-readable medium as recited in claim 12, wherein the computer-program instructions for extracting the one or more sentences is further a function of a configurable target sentence length selected from eight (8) to sixteen (16) bars in length.

17. A computer-readable medium as recited in claim 12, wherein the computer-program instructions further comprise instructions for adjusting length of the music snippet as a function of boundary confidence of previous and subsequent music sentences.

18. A computing device for extracting a music snippet from a music stream, the computing device comprising:

a processor; and a memory comprising computer-program instructions executable by the processor for:

dividing the music stream into multiple frames of fixed length;

identifying a most-salient frame of the multiple frames;

extracting one or more music sentences from the music stream as a function of peaks and valleys of acoustic energy across sequential music stream portions by:

(a) calculating a respective sentence boundary possibility for each frame of the multiple frames; and (b) for each of the one or more sentences, determining a last frame for the sentence as a function of a corresponding sentence boundary possibility; and selecting the music snippet as a sentence of the one or more sentences that comprises the most-salient frame.

19. A computing device as recited in claim 18, wherein each frame overlaps another frame with respect to time by a set amount.

20. A computing device as recited in claim 18, wherein extracting the one or more sentences is further a function of a configurable target sentence length of eight (8) to sixteen (16) bars of music.

21. A computing device as recited in claim 18, wherein the computer-program instructions further comprise instructions for adjusting length of the music snippet as a function of a boundary confidence of previous and subsequent music sentences.

22. A computing device as recited in claim 18, wherein the computer-program instructions for identifying the most-salient frame further comprise instructions for:

calculating a respective saliency value for each frame, and wherein the most-salient frame is a frame of the multiple frames having a largest value of the respective saliency values; and wherein the respective saliency value for a frame of the multiple frames is based on acoustic energy of the frame, a frequency of occurrence of the frame across the music stream, and a positional weight of the frame.

23. A computing device for extracting a music snippet from a music stream, the computing device comprising processing means for:

dividing the music stream into multiple frames of fixed length;

identifying a most-salient frame of the multiple frames;

extracting one or more music sentences from the music stream as a function of peaks and valleys of acoustic energy across sequential music stream portions; and selecting the music snippet as a sentence of the one or more sentences that comprises the most-salient frame.

24. A computing device as recited in claim 23, wherein the processing means for extracting the one or more sentences is further comprises means for:

calculating a respective sentence boundary possibility for each frame of the multiple frames; and for each of the one or more sentences, determining a last frame for the sentence as a function of a corresponding sentence boundary possibility.

25. A computing device as recited in claim 23, wherein the processing means further comprises means for adjusting music snippet length as a function of boundary confidence of previous and subsequent music sentences.

* * * * *